United States Patent
Shackelford et al.

(10) Patent No.: US 7,222,719 B2
(45) Date of Patent: May 29, 2007

(54) CONTAINER TRANSPORT AND ORGANIZING APPARATUS FOR USE IN MANUFACTURING OPERATIONS AND METHOD THEREOF

(75) Inventors: Michael L. Shackelford, Joplin, MO (US); Donald W. Sonntag, Carl Junction, MO (US)

(73) Assignee: Reagent Chemical & Research, Inc., Ringoes, NJ (US)

( * ) Notice: Subject to any disclaimer, the term of this patent is extended or adjusted under 35 U.S.C. 154(b) by 0 days.

(21) Appl. No.: 10/699,622

(22) Filed: Oct. 31, 2003

(65) Prior Publication Data

US 2005/0098408 A1    May 12, 2005

Related U.S. Application Data

(60) Provisional application No. 60/423,308, filed on Nov. 1, 2002.

(51) Int. Cl.
*B65G 47/30* (2006.01)
(52) U.S. Cl. ............... 198/459.2; 198/443; 198/453
(58) Field of Classification Search ............ 198/396, 198/397.01, 397.02, 397.03, 397.04, 397.05, 198/397.06, 443, 453, 459.2
See application file for complete search history.

(56) References Cited

U.S. PATENT DOCUMENTS

| | | | | |
|---|---|---|---|---|
| 2,609,912 A | * | 9/1952 | Engel | 198/397.06 |
| 3,276,566 A | * | 10/1966 | Raasch | 198/395 |
| 3,468,407 A | * | 9/1969 | Furst | 198/443 |
| 3,776,346 A | * | 12/1973 | Dubuit | 198/396 |
| 4,042,098 A | * | 8/1977 | D'Agnolo et al. | 198/393 |
| 4,099,609 A | * | 7/1978 | Kieronski et al. | 198/395 |
| 4,588,069 A | * | 5/1986 | Sticht | 198/443 |
| 4,657,130 A | * | 4/1987 | Ackley et al. | 198/397.04 |
| 5,695,041 A | * | 12/1997 | Kouda et al. | 198/459.2 |

OTHER PUBLICATIONS

Squeeze Tube Filling Equipment, Item No. LVF RT 40, distributed by Prosys Innovative Packaging Equipment, 422 East 17th Street, Webb City, Missouri 64870.
Squeeze Tube Filling Equipment, Item No. LVF RT 70, distributed by Prosys Innovative Packaging Equipment, 422 East 17th Street, Webb City, Missouri 64870.
Automatic Squeeze Tube Filling Equipment, Item No. LVF RT 140, distributed by Prosys Innovative Packaging Equipment, 422 East 17th Street, Webb City, Missouri 64870.

\* cited by examiner

*Primary Examiner*—Mark A. Deuble
(74) *Attorney, Agent, or Firm*—Timothy J. Martin; Michael R. Henson; John W. Carpenter

(57) ABSTRACT

An apparatus and method for transporting containers to be processed in a manufacturing operation includes a transfer assembly that transfers containers from a load area on an upstream conveyor assembly to a discharge on downstream conveyor assembly for further processing. The upstream conveyor assembly may include longitudinally extending first and second conveyors oriented at an angle to one another. The transfer assembly may include a rotating wheel that picks containers from a chute and moves them, one at a time, to the downstream conveyor assembly. The downstream conveyor assembly may be in the form of an elevator that has bays that are sized to receive individual containers. The bays are formed by vanes on a moving belt. The method includes steps inherent in the structure, including receiving a bulk supply of containers, moving them horizontally, columnizing them into a single file, elevating them and thereafter discharging them.

40 Claims, 6 Drawing Sheets

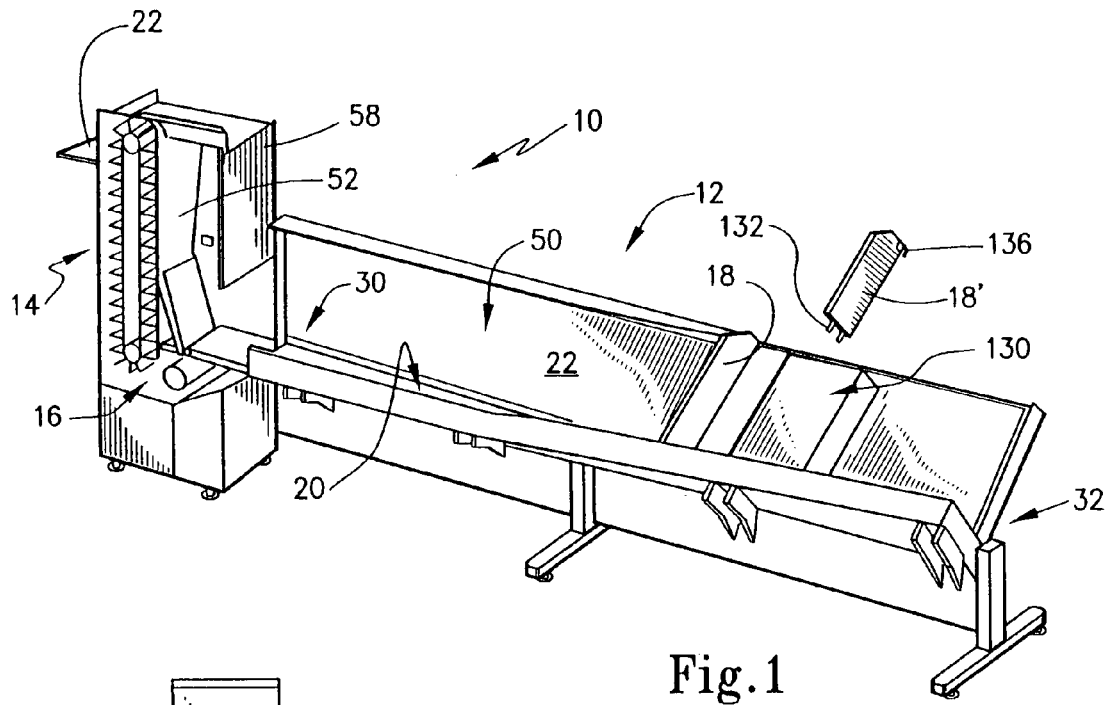
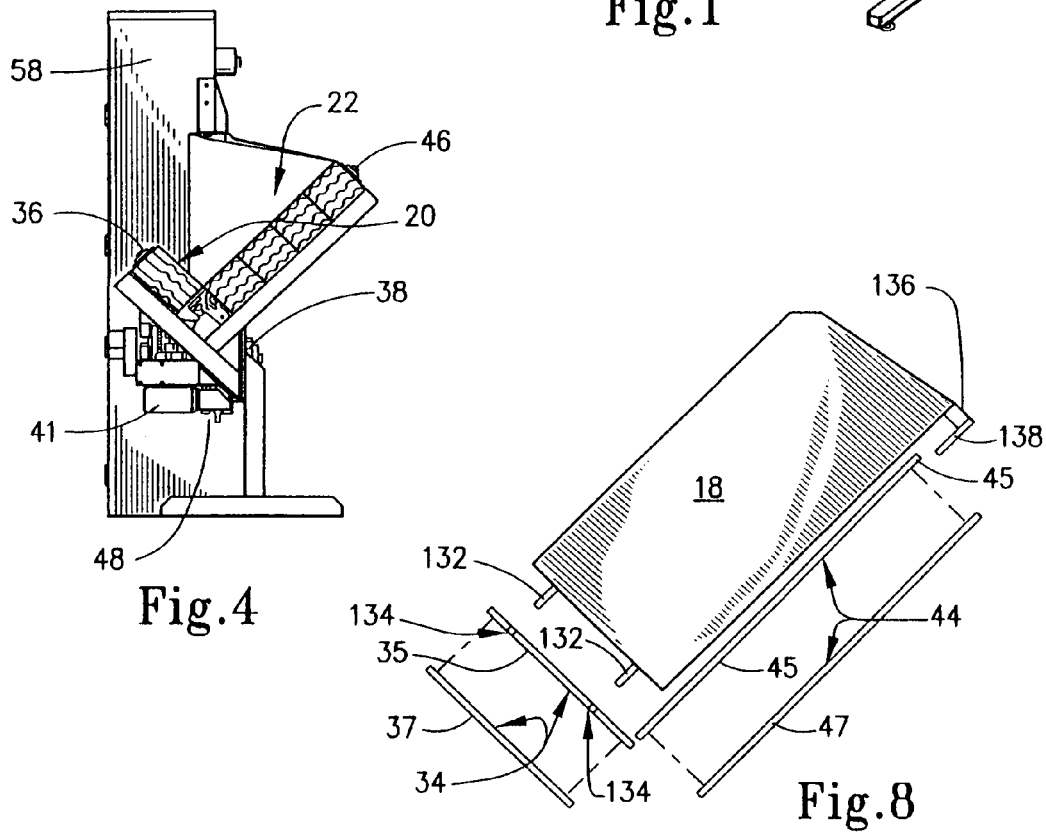
Fig.1
Fig.4
Fig.8

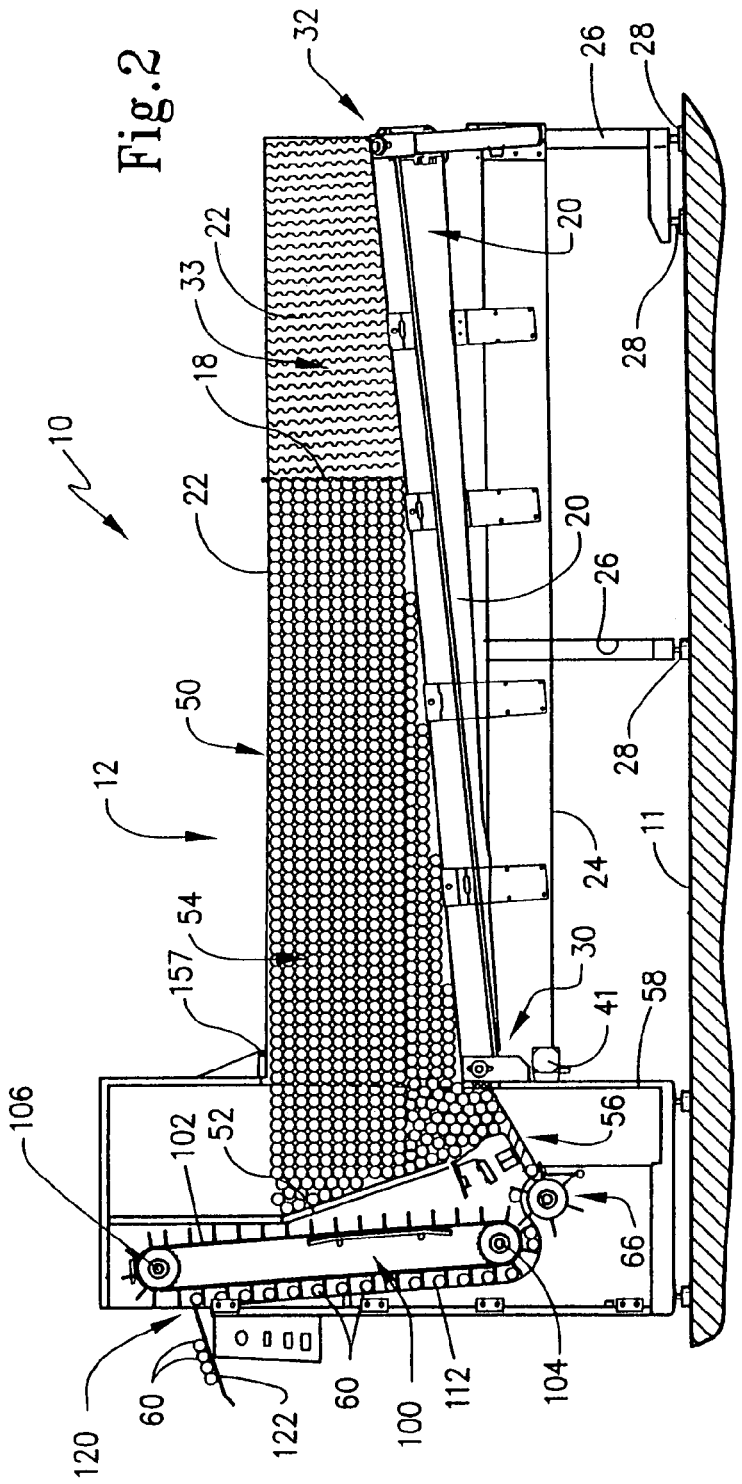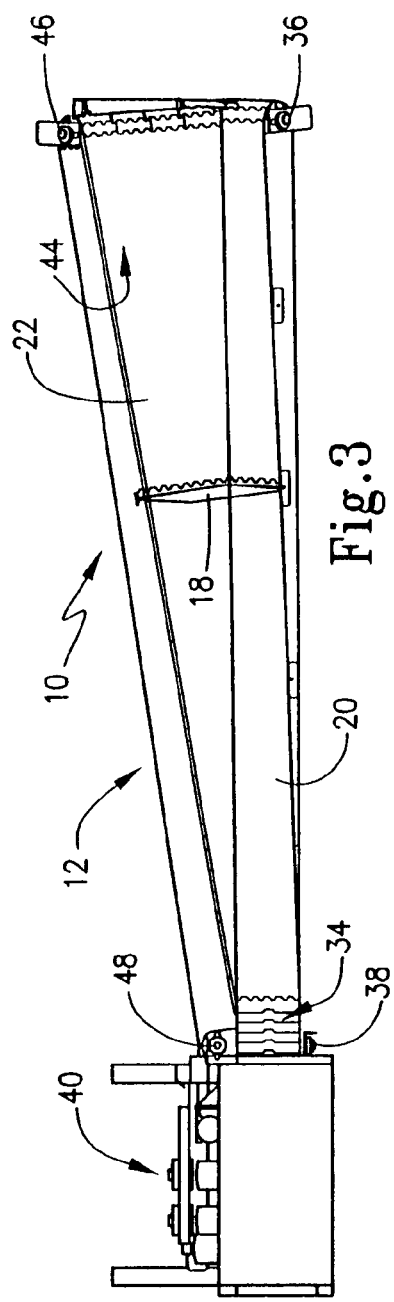

CONTAINER TRANSPORT AND ORGANIZING APPARATUS FOR USE IN MANUFACTURING OPERATIONS AND METHOD THEREOF

CROSS REFERENCE TO RELATED APPLICATIONS

This application claims the benefit of U.S. Provisional Application No. 60/423,308 filed Nov. 1, 2002.

FIELD OF THE INVENTION

The present invention broadly relates to packaging equipment of the type used in automated processes. More particularly, the present invention is directed to manufacturing equipment that provides a supply of containers that may be subsequently filled and packaged for distribution. The invention specifically concerns tube-feeding mechanisms that can receive a bulk supply of containers and place them in a single file stream such that they may then be accessed by other equipment in the packaging process.

BACKGROUND OF THE INVENTION

The packaging of products for storage and consumption is a significant global industry. Various known packages include cartons, boxes, cans, tubes, pouches, to name a few. Packaged products encompass virtually any type of product that is available for consumption from large appliances to small incidental items.

One of the major types of packaging is the tubular container. A tubular container is generally circular in configuration, although other tubular container cross sections are known, and is elongated about a central axis. Typically, these tubular containers are sealed at each end by an end closure. In some instances, the end closure is provided by a creased or folded seal so that the container takes on what is known as a tooth-paste tube configuration. Other tubular containers have end closures that are either pressed fit or roll sealed on the end of the tube.

When tubular containers are filled with the desired commodity, a bulk supply of tubes is usually provided with each of these tubes having one end closure already in place. The tube is placed vertically in a machine with the open end of the container oriented vertically. The commodity to be packaged is then dispensed into the tubular container and the remaining open end is sealed so that the product is packaged for ultimate use. The sealed containers containing the product may then be further cartoned, if desired, for distribution.

It is known to use tube-filling machines wherein bulk tubes are loaded into a small tube-feeding bin. These tube-filling machines then organize the tubes into a single file stream with the tubes being delivered sequentially to a tube filler assembly. Unfortunately, most of these tube-filling machines have a relatively small tube-feeding bin of only a few square feet in cross section. Since many tube filling machines run at speeds of 60 to 140 tubes per minute, but can reach speeds of 400 tubes per minute. Such a tube filling machines can rapidly exhaust the small supply of available tubes in the tube feeding bin. This requires an operator who continuously loads tubes into the bin. On one hand, this process is very labor intensive and typically requires an operator to constantly attend the tube-filling machine. In addition, the constant movement by the operator of a small quantity of tubes into the tube-feeding bin is not ergonomic.

As a result of these problems, robotic systems are known wherein the robotic system will unload tubes automatically from bulk containers. Typically, these robotic systems are expensive. Moreover, it is difficult for these systems to accommodate or adjust to tubes of varying sizes. Moreover, these robotic systems are usually dependant upon a consistent tube-to-box layout, that is, the bulk tubes must be in a consistent array in all boxes for the robotic system to unload them.

Accordingly, there is a need for improved container loader/feeders that are automated. There is a need for such automated systems to store large quantities of bulk tubes yet retrieve these tubes and sequentialize them for delivery to tube filling apparatus. There is a further need for such equipment to easily accommodate tubes of different sizes and shapes.

OBJECTS OF THE INVENTION

It is an object of the present invention to provide a new and useful tube loader or feeder that is simple in design and easy to employ.

It is another object of the present invention to provide a tube loader that is automated that is relatively independent of the box configuration of bulk tubes.

Still a further object of the present invention is to provide a tube loader that is more ergonomic in construction.

Yet another object of the present invention is to provide a tube loader with a large adjustable feeding bin capacity so as to reduce the attendant time of an operator.

Still a further object of the present invention is to provide a method for processing bulk tubes into a sequential stream that is an improvement over existing processes.

According to the present invention then, an apparatus is provided that is adapted to transport and organize containers in a manufacturing operation. Broadly, the apparatus includes an upstream conveyor assembly that has a load area at an upstream location thereof and that is operative to transport containers placed thereon in a downstream direction thereby to create a reservoir container at a downstream supply area thereof. The apparatus also includes a downstream conveyor assembly that includes a plurality of bays each sized and adapted to receive a single container therein. The downstream conveyor assembly is operative to transport these containers in the downstream direction from an intake location to a discharge location such that the containers will be discharged in a single file at the discharge location. Accordingly, the downstream conveyor assembly is operative to sequentially advance the bays intake location. Finally, the apparatus broadly includes a transfer assembly that is operative to sequentially remove selected containers, one at a time, from the reservoir and to sequentially transport each of these selected containers to the intake location of the downstream conveyor assembly. The transfer assembly thereafter deposits each selected container into a respective bay as the bays are sequentially advanced past the intake location by the downstream conveyor assembly.

In the disclosed embodiments of the present invention, the upstream conveyor assembly includes a longitudinally extending first upstream conveyor and a longitudinally extending second upstream conveyor. The first upstream conveyor has a first upstream conveyor belt with a first upstream belt advance portion and a first upstream belt return portion. Similarly, the second upstream conveyor has a second upstream conveyor belt with a second upstream belt advance portion and a second upstream belt return portion. The first and second upstream conveyor belts are located longitudinally alongside one another with the first upstream belt advance portion and the second upstream belt advance portion being oriented at an orientation angle with respect to one another. The first and second upstream belt advance portions thereby define support surfaces for the transport of containers placed thereon. This orientation angle is shown to be about 90 degrees.

In one embodiment, the first and second upstream conveyors longitudinally spiral over a rotational angle from the upstream location toward the downstream location. Here, again, it is shown that the rotational angle is about 45 degrees. Thus, at the upstream location, the first and second upstream belt advance portions are each oriented at about 45 degrees to the horizontal when the apparatus is in the assembled state. At the downstream supply area, the first upstream belt advance portion is oriented generally parallel to the support surface while the second upstream belt advance portion is oriented generally at a right angle to the support surface.

At any rate, the first and second upstream conveyors are driven at a common rate of speed. At least one divider panel may be included with this divider panel being adapted to be removably secured to the first and second upstream belt advance portions for common movement therewith. When secured, the divider panel forms an upstream wall for supporting containers located downstream thereof thereby to define a supply bin of variable size for holding the reservoir containers.

In one embodiment, the upstream conveyor assembly also includes a cassette loader located at the load area. This cassette loader is moveable between a load position and an unload position. The cassette loader is adapted to receive a bulk supply of containers when in the load position and is operative when moved to the unload position to deposit the bulk supply of containers onto the upstream conveyor assembly for transport in the downstream direction toward the transfer assembly. Here, the cassette loader may be pivotally supported relative to the upstream conveyor assembly. The cassette loader also includes a cassette bottom wall, at least one cassette sidewall and at least one cassette end wall for supporting containers placed therein.

Turning to the downstream conveyor assembly, the embodiments of the present invention are shown to include a downstream conveyor belt having a downstream belt advance portion and downstream belt return portion. The downstream conveyor belt also has a plurality of vanes supported thereon for common movement therewith. The downstream conveyor belt and adjacent ones of these vanes thus define bays for receipt of individual containers. Moreover, the downstream conveyor belt is shown to include a restraining guide that extends alongside and that is in spaced relation to the downstream belt advance portion. The restraining guide is operative to retain containers within the bays as the containers are advanced from the intake location to the desired location. The restraining guide can include a guide panel having a width about the same as the downstream conveyor belt. Here, also, the intake location is situation at the junction region of the downstream belt advanced portion and the downstream belt return portion of the downstream conveyor belt. The restraining guide can then include an arcuate guide portion that extends at least partially around the advanced portion and the return portion at the intake location. The downstream conveyor belt further includes a discharge ramp disposed proximately to the discharge location.

With respect to the transfer assembly, it may include a rotatable transfer wheel that has a plurality of radially projecting prongs that are oriented to engage each of the selected containers and the sequentially transport each selected container to the intake location of the downstream conveyor assembly. Here, also, the transfer assembly can include a chute having a terminal end located proximately to the transfer wheel. The chute is adapted to receive containers from the reservoir and is dimensioned to allow single file passage of the containers therethrough. A shoe may be disposed at terminal end of the chute with the shoe adapted to position each selected container for engagement by the transfer wheel. The transfer assembly can include generally parallel first and second plate portions that form the chute. These first and second plate portions are spaced apart from one another a distance selected to allow single file passage of the containers therethrough. A first plate portion may also be reciprocally moveable in the upstream and downstream directions while the second plate portion may be laterally moveable so as to move toward and away from the first plate. The second plate can then include a sensor associated therewith to detect deflections of the second plate that are greater than a selected threshold. The transfer assembly can also include a paddle member pivotally disposed to the position to act on the containers in the reservoir, in an air-actuated cylinder is operative to reciprocally pivot the paddle member to prevent jamming of the containers when in the reservoir.

The present invention is also directed to method of handling and organizing containers in a manufacturing operation. This method can include any of the steps that are contemplated by the structure described above. Broadly, however, the method includes the first step of loading a bulk supply of containers at an upstream load area or an upstream conveyor assembly. Thereafter, the bulk supply of containers is advanced generally horizontally in a downstream direction thereby to create a reservoir of containers at a downstream supply area. The method then includes the step of columnizing the containers into a single file column and thereafter transporting each individual container to a location elevated with respect to the upstream conveyor assembly. Finally, the method includes discharging each individual container at a discharge location for further manufacturing operations.

As noted, this method may include any of the steps inherent in the above-described embodiments of the apparatus. Specifically, where the containers are each elongated in configuration along a central axis, the step of loading a bulk supply of containers at the upstream location is accomplished by placing the containers on an upstream conveyor assembly with the central axis of the containers oriented generally horizontally and transversely to the downstream direction.

These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 1 is a perspective view of a container transport and organizing apparatus in the form of a tube loader according to a first exemplary embodiment of the present invention;

FIG. 2 is a side view in elevation, in diagrammatic form, of the container transport and organizing apparatus (tube loader) of FIG. 1;

FIG. 3 is a top plan view, again diagrammed, of the container transport and organizing apparatus (tube loader) of FIG. 2;

FIG. 4 is an end view in elevation, again in diagrammatic form, of the container transport and organizing apparatus (tube loader) of FIGS. 2 and 3;

FIG. 8 is a cross sectional view of a portion of the upstream conveyer assembly of the tube loader of the present invention illustrating the use of a divider panel therewith;

DETAILED DESCRIPTION OF THE EXEMPLARY EMBODIMENTS

The present invention relates to a container transport and organizing apparatus in the form of a tube loader, also referred to as a tube feeder, which is able to receive bulk containers at a storage location and subsequently transports these containers in a sequential manner for further manufacturing operations, such as a filling operation. Accordingly, the present invention not only contemplates the mechanical structure of such an apparatus, but also the method that is inherent in the structure, all as described below. Moreover, it should be understood that, while the present invention is described with respect to cylindrical tubular containers, the ordinarily skilled artisan would be able to employ this process with containers of different shapes and configurations upon learning the structure and methods taught herein.

Figure 5:
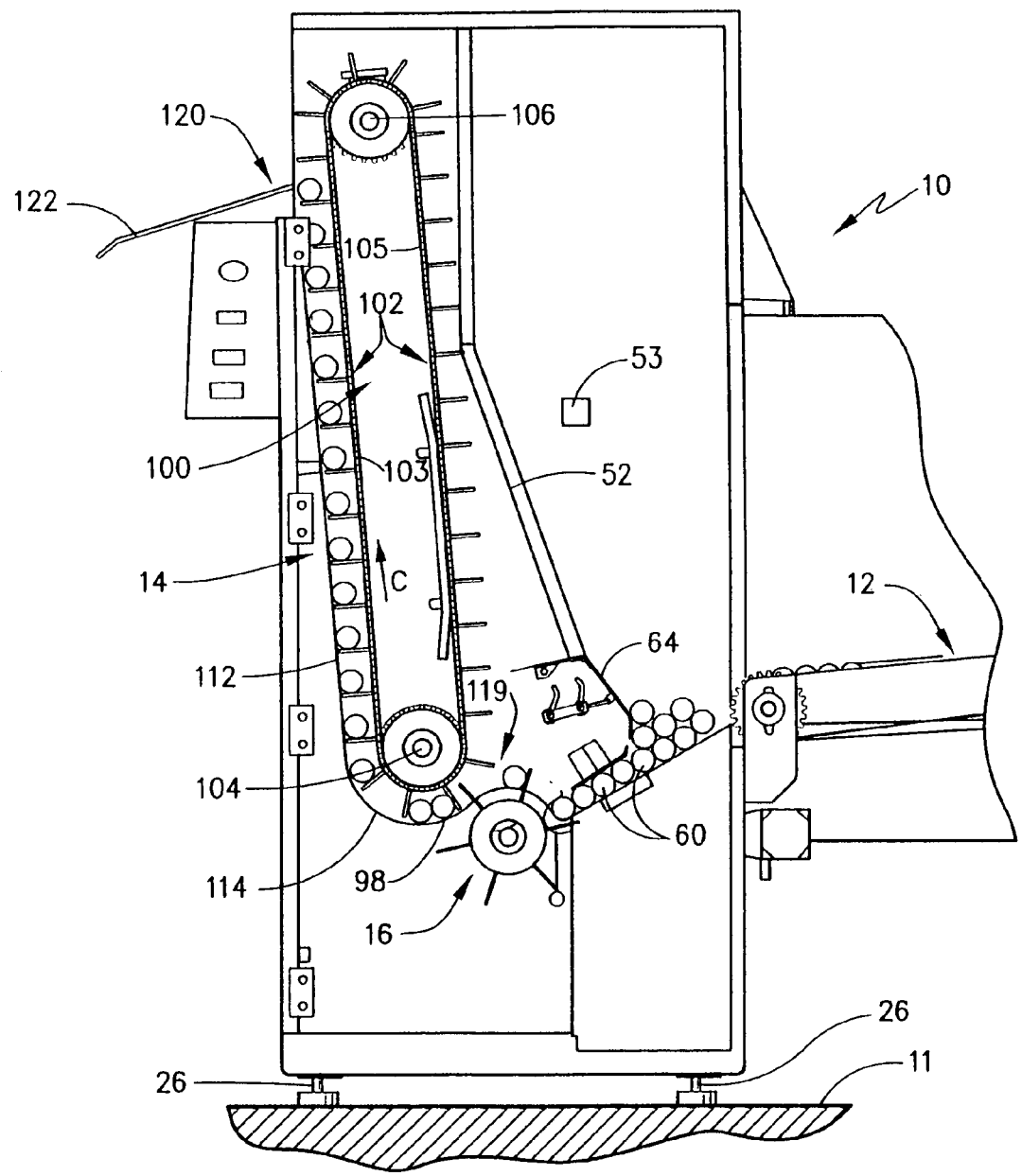
FIG. 5 is an enlarged side view in elevation of the downstream conveyor assembly (elevator) according to the present invention.

A first exemplary embodiment of a container transport and organizing apparatus according to the present invention, hereinafter referred to as a tube loader, is introduced in FIG. 1. In this figure, tube loader 10 is illustrated and includes three assemblies. A first section is in the form of an upstream conveyor assembly 12 that, as is described below, has a load area to receive bulk tubes from a tube supply, either with an automated process or a manual process. A second, or downstream conveyor assembly is in the form of a tube elevator 14 with this section being operative to elevate tubes to an unload station for gravity discharge. A third assembly, in the form of a container transfer assembly 16 operates to receive containers such as tubes from upstream conveyor assembly 12 and transfer them to elevator 14. As is shown in FIGS. 4 and 5, apparatus 10 is adapted to be positioned on a generally horizontal support surface 11, such as the floor of a manufacturing facility, when in an assembled state.

With reference to FIGS. 1–4, it may be seen that upstream conveyor assembly 12 is formed of a longitudinally extending first upstream conveyor referred to as lower conveyor 20 and a longitudinally extending second upstream conveyor referred to as an upper conveyor 22. Each of conveyors 20 and 22 is supported by a structural framework 24 that is positioned on a support surface 11 by means of legs 26. Legs 26 are adjustable in height by threaded pads 28 which serve not only to adjust the height but also to level the conveyor assembly 12.

As may be best seen in FIG. 2 and 4, lower conveyor 20 and upper conveyor 22 extend in their longitudinal direction generally horizontally with respect to support surface 11, and they are oriented generally perpendicularly to one another. The plane of lower conveyor 20 is generally horizontal at a downstream end and, accordingly, the plane of upper conveyor 22 is generally vertical at the downstream end 30. However, at an upstream end 32, the planes of each of lower conveyor 20 and upper conveyor 22 are oriented at approximately 45° to the horizontal. Thus, conveyor assembly 12 twists or spirals 45° counterclockwise relative to the longitudinal downstream direction. A load area 33 is provided by lower conveyor 20 and upper conveyor 22 of upstream conveyor assembly 12 and is located proximately to upstream end 32. Load area 33 is sufficient for the loading of a bulk supply of containers thereon.

Lower conveyor 20 includes a longitudinally extending first upstream conveyor belt in the form of continuous loop conveyor belt 34 that is supported on suitable rotatable axles, such as upstream axle 36 and downstream axle 38. Axle 38 is driven by motor and gear box assembly 41 of a type generally known in the art so that the structure thereof is not described in detail. First upstream conveyor belt 34 has a first upstream belt advance portion 35 and a first upstream belt return portion 37, as is shown in FIG. 8. Likewise, upper conveyor 22 includes a longitudinally extending second upstream conveyor belt in the form of a continuous loop conveyor belt 44 supported by rotatable upstream axle 46 and downstream axle 48. Second upstream conveyor belt 44 has a first upstream belt advance portion 45 and a first upstream belt return portion 47, again as is shown in FIG. 8. First and second upstream advance portions 35 and 45 are accordingly oriented at the orientation angle described above, namely, at about 90°, to define support surfaces for containers placed thereon. To this end also, it should be noted that conveyor belts 34 and 44 are driven at a common rate of speed.

Figure 7:
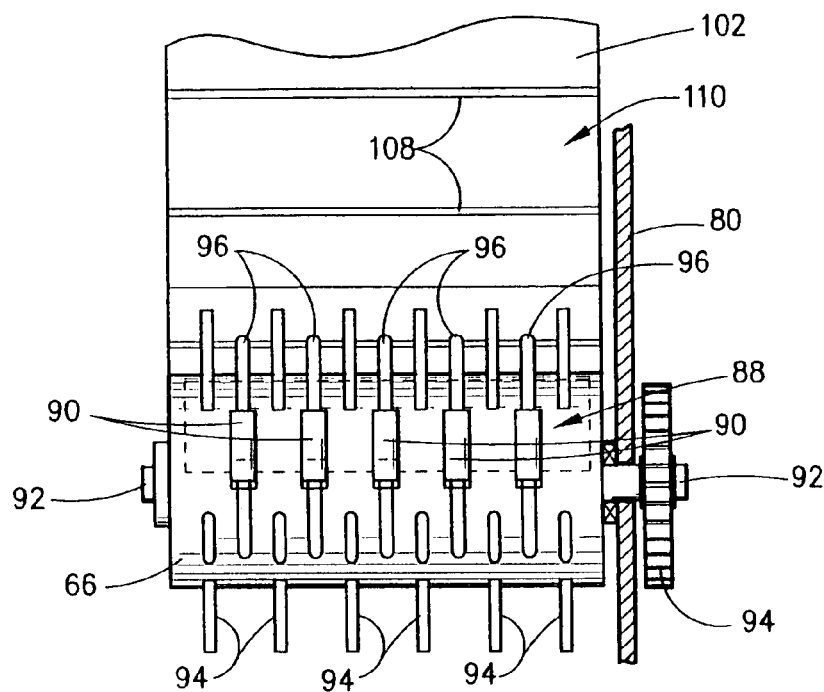
FIG. 7 is a cross sectional view taken about lines 7—7 of FIG. 6.

With reference to FIGS. 1, 2 and 5, it may be seen that conveyor assembly 12 carries a divider panel 18, and preferably two divider panels 18 are employed, as described more thoroughly below in reference to FIGS. 1 and 7. In any event, with reference now to FIG. 2, it may be seen that a divider panel 18 forms a rear end wall for a changeable tube feeding bin 50 of varying size. The front wall of tube feeding bin 50 is formed by front plate 52 so that a supply of tubes 54 are supported on conveyor belts 34 and 44 between front plate 52 and divider panel 18. These tubes are then presented sequentially to tube transfer assembly 16 at conveyor discharge 56 located in elevator stand 58. A sensor 53 is provided to monitor the level of containers proximate to plate 52.

Figure 6:
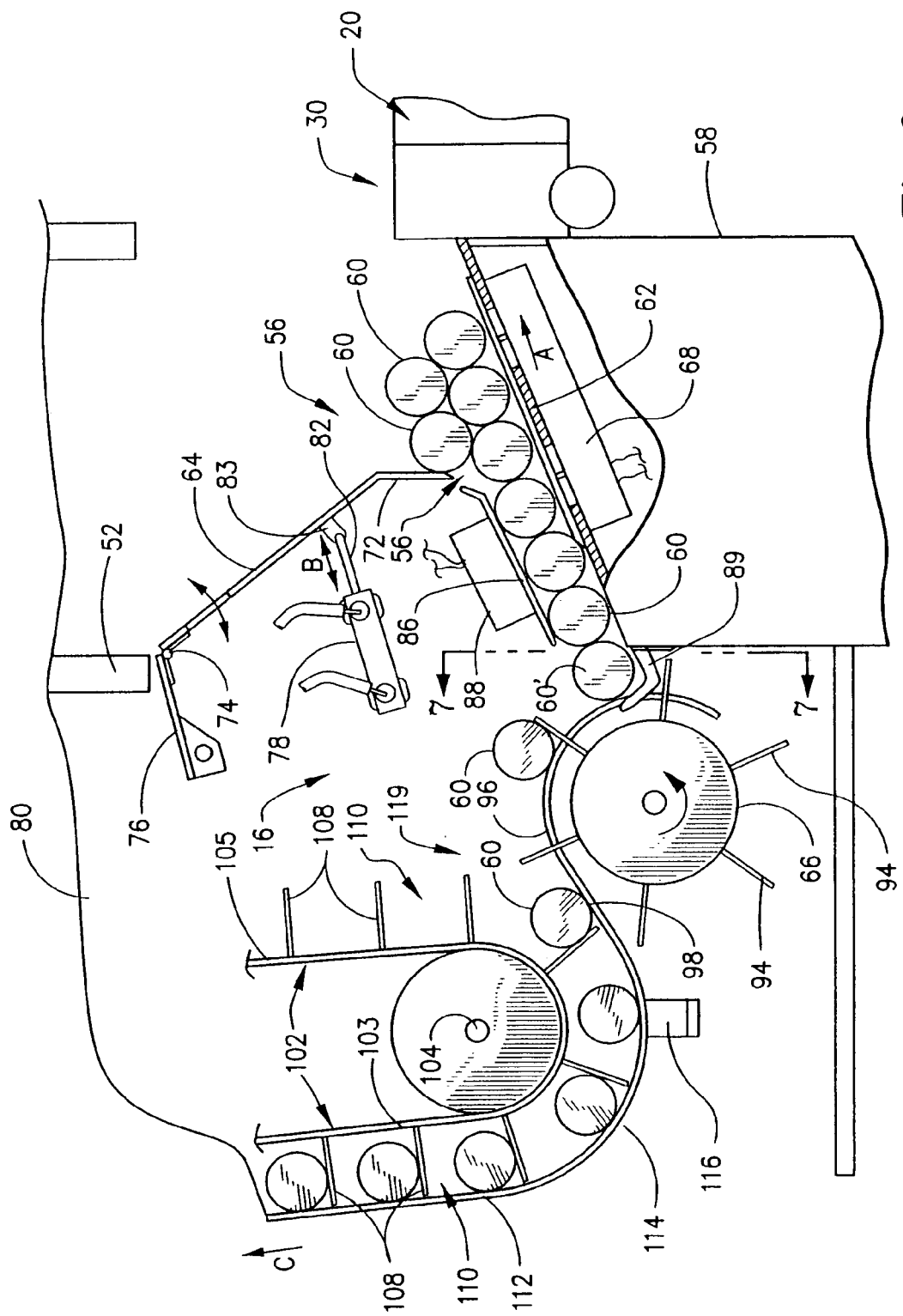
FIG. 6 is an enlarged front view in elevation showing the structure and transfer of tubes from the conveying portion of the container transport and organizing apparatus (tube loader) of the present invention to the vertical elevator thereof.

With reference now to FIGS. 5 and 6, it may be seen that individual containers or tubes 60 are transferred from tube supply 54 in sequence by tube transfer assembly 16. Tube transfer assembly 16 is shown to include an agitator plate 62, a hinged paddle plate 64 and a rotating transfer wheel 66 along with other associated mechanical structures. First, with respect to agitator plate 62, it may be seen that agitator plate 62 is mounted for reciprocal motion between the upstream and downstream directions as illustrated by arrow "A". A suitable reciprocal drive 68 is provided and is secured to upper wall 70 and is mechanically connected to agitator plate 62 so that is may drive agitator plate 62 reciprocally in the direction of arrow "A". Hinged paddle plate 64 has a lower vertical panel 72 which is vertically spaced from agitator plate 62 a distance to accommodate a single tube to pass there between but to restrict passage of more than a single tube. Hinged paddle plate 64 is secured at an end opposite panel 64 to a hinge 74 that, in turn, is secured to a rigid support piece 76. An air actuated cylinder 78 is mounted to back wall 80 and includes a piston rod 82 that is pivotally connected to a clevis 83. Cylinder 78 acts to reciprocate rod 80, as shown by arrow "B", such that the throw of rod 82 acts to pivot hinge plate 64 over a small angle. This pivotal motion, in conjunction with the reciprocal motion of agitator plate 62 facilitates the transfer of single tubes at conveyor discharge 56.

The presence of single tubes may be sensed by control plate 86 and its associated sensor 88. Plate 86 is laterally movable with respect to the transport direction, i.e., toward and away from agitator plate 62. Plate 86 and sensor 88 act to detect any misfeed of tubes 60, 60' (FIG. 6) such that, if more that one tube is present, or if a tube is misaligned, sensor 88 can sense the excess deflections of plate 86 and, in response, can deactivate tube loader 10 until the mechanism is cleared. Control plate 86 is thus generally parallel to and spaced from agitator plate 62 a distance about equal to the diameter of a single tube 60. In this manner they define a chute having a terminal end proximate to the transfer wheel 66 to allow single file passage of tubes therethrough.

After tube 60 sequentially moves between control plate 86 and agitator plate 62, they are presented, one at a time, to shoe 89. Shoe 89 is best illustrated in FIGS. 6 and 7, and it should be appreciated that shoe 89 is formed of a plurality of hooked fingers 90 that are uniformly spaced apart from one another so as to form a dwell seat for a tube 60' that is ready for transfer by transfer assembly 16. This transfer is accomplished by transfer wheel 66 that is rotatably journaled on axle 92. Axle 92 is connected to a drive gear 94 that is rotatably linking to motor assembly 40 (FIG. 3). Transfer wheel 66 carries a plurality of rows of prongs 94 that are spaced equidistantly as are fingers 90 that are spaced between fingers 90 as transfer wheel 66 rotates. Each row of prongs 94 then sequentially picks up a tube from shoe 89 and transfers the tubes, one at a time, to tube elevator 14. To facilitate this, tube transfer assembly 16 includes a plurality of arcuate guide bars 96 that are aligned with fingers 90 in the downstream transfer direction. Guide bars 96 serve to support each tube 60 as it is transferred over the top of transfer wheel 66. Guide bars 96 each include a downwardly sloped linear section 98 that allows gravity to convey the tubes 60 into tube elevator assembly 14.

With continuing reference to FIGS. 5 and 6, but also with reference to FIG. 2, it may be seen that the downstream conveyor assembly includes tube elevator 14 that has an upright conveyor 100. While any orientation wherein the upper portion of the downstream conveyor assembly is above the lower end, so that it is "upright" in relation to the support surface, it is often desirable that the angle to the support surface be large (60° to 90°). In the figures, tube elevator/conveyor assembly 14 is shown to be substantially vertical. Conveyor 100 includes a downstream conveyor belt in the form of continuous loop conveyor belt 102. Conveyor belt 102 is rotatably supported on upstream axle 104 and downstream axle 106 that are mechanically coupled to and driven by motor assembly 40 so as to have a downstream belt advance portion 103 and a downstream belt return portion 105.

Conveyor belt 102 carries a plurality of transverse vanes 108 that are spaced apart to one another. Vanes 108 in conjunction with belt 102 thus define a plurality of bays 110 that each will sequentially receive an individual tube 60. To this end, a guide panel 112 is mounted in parallel to an advance section 102 prime of conveyor belt 102 in order to prevent tubes 60 from falling out of a respective bay 110 as the tubes are vertically advanced in the direction of arrow "C". Guide panel 112 includes a lower arcuate portion 114 that extends as a continuation of sloped linear sections 98 of guide bars 96 at an intake location 119. Intake location 119 may be seen to be situated at a junction region of the advance and return portions of the downstream conveyor belt at axle 104. The ends of guide bars 96 and the edge of panel 112, then, are mounted to and supported by a suitable bracket 116. At this point, it is important to appreciate that the position and timing of transfer wheel 66 and conveyor belt 102 with its vanes 108 are such that prongs 94 do not contact vanes 108 during operation.

With reference again to FIGS. 1, 2 and 5, it may be seen that tubes 60 move from intake location 119 and approach the discharge location at the top of tube elevator 14. Here, they reach a discharge port 120 and travel single file down a tube discharge ramp 122 under the force of gravity so that tubes 60 are in a ready state for further processing.

The loading of tubes 60 onto conveyor assembly 12 may now be best appreciated with references to FIGS. 1, 2 and 8. In FIG. 1, it may be seen that a large number of tubes 60 may be located in tube feeding bin that has its upstream wall formed by divider panel 18. When it is desired to load additional tubes onto conveyor assembly 12, the operator inverts a box 130 of tubes onto upper conveyor 22. With reference to FIG. 1, the operator then places another divider panel 18' on the upstream side of box 130 and then removes box 130 so that the tubes contained therein may cascade between divider panels 18 and 18'. At this point, the downstream divider panel 18 may be removed since it is no longer necessary. When loaded on conveyor assembly 12, the tubes are placed so that their respective elongate central axes are generally horizontal to advance portions 35 and transverse to the downstream direction of travel.

Divider panels 18 are structured so as to travel with conveyor belts 34 and 44 on lower conveyor 20 and upper conveyor 22, respectively. To this end, as is shown in FIG. 8, divider panel 18 includes a pair of posts 132 on the lower edge. These posts 132 can mate with pairs of holes 134 formed in conveyor belt 134. Here, it should be understood that an array of holes 134 are provided so that divider panel 18 may be located as desired all along conveyor belt 34. An upper corner of divider panel 18 supports a hooked bracket 136 including a downwardly extending flange 138 so that it may be hooked over upper edge 45 of conveyor belt 44. The cooperation of bracket 136 and post 132 along with holes 134 then serve to position divider panel 18 for transport with the conveyor assembly 12. The divider panel 18 thus forms an upstream wall for supporting containers located downstream thereof as a supply bin or reservoir of variable size. Conveyor 12 is provided with a suitable sensor 151 that can detect contact with a panel 18 to deactivate conveyor 12.

The operation and method accomplished by the tube loader according to the present invention may now be appreciated more fully. First, an operator loads conveyor assembly 12 with a desired quantity of containers or tubes to be sequentially dispensed. Activation of tube loader 10 through motor assembly 41 causes upper conveyor 22 and lower conveyor 20 to advance at a common speed with the tubes being supported in generally perpendicular planes during this motion. Sensor 53 operates to instruct the activation of tube loader 10 so as to maintain an available supply of tubes. Concurrently, conveyor 102 of tube elevator 114 of driven in a clockwise manner and transfer wheel 66 of tube transfer assembly 16 is driven in a counter clockwise manner by motor assembly 40. However, should a panel 18 travel the full length of conveyor 12, sensor 151 will turn off motor assembly 41.

Tube transfer assembly picks up individual tubes from tube feeding bin 50 that is defined by moving divider panel 18 and front plate 52 and transports them for deposit into the individual bays 110 of elevator 14 where tubes are individually elevated to discharge 120 after which they are gravity fed downwardly on ramp 122. Each tube resides in an individual bay on tube elevator 14. As the supply of tubes on conveyor assembly 12 begins to be exhausted, an array of tubes in box 130 is inverted onto the conveyor apparatus, and a divider panel is placed upstream of box 130. Box 130 is removed and, thereafter, the downstream divider panel 18 is moved so that additional tubes are now available in adjustable tube feeding bin 50. To this end, it should be understood that the effective size tube feeding bin 50 changes as the conveyors advance to move a divider panel 18 in the downstream direction.

Tube elevator 14, transfer wheel 66 and conveyor assembly 12 are suitably timed, either by mechanical couplings (for example chain drives) or electronically so that tubes 60 are presented at conveyor discharge 56 at the rate which they can be picked up by transfer wheel 66. To facilitate this discharge, tubes 60 are agitated both by agitator plate 62 and by hinged plate 64 so that the tube supply resist cavitations. Moreover, should a tube become misaligned or should the tubes not be presented sequentially at conveyor discharge 56, control plate 86 activates sensor 88 to deactivate the machine until an operator can clear the same.

Figure 9:
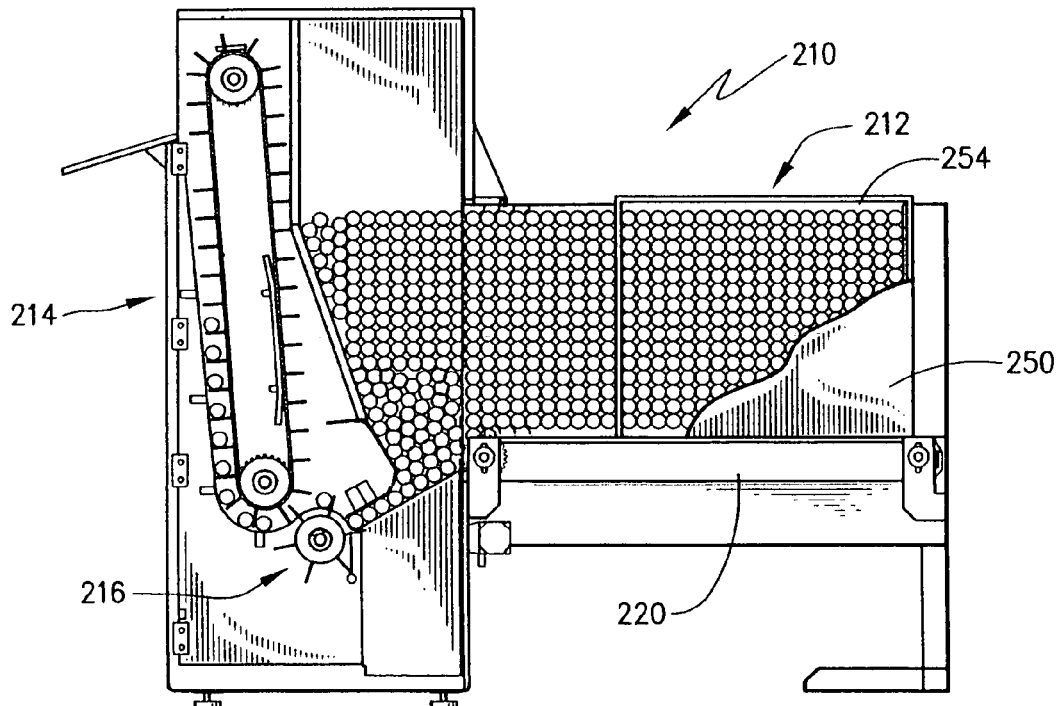
FIG. 9 is a front view in elevation, in diagrammatical form, illustrating a second embodiment of the present invention.
Figure 10:
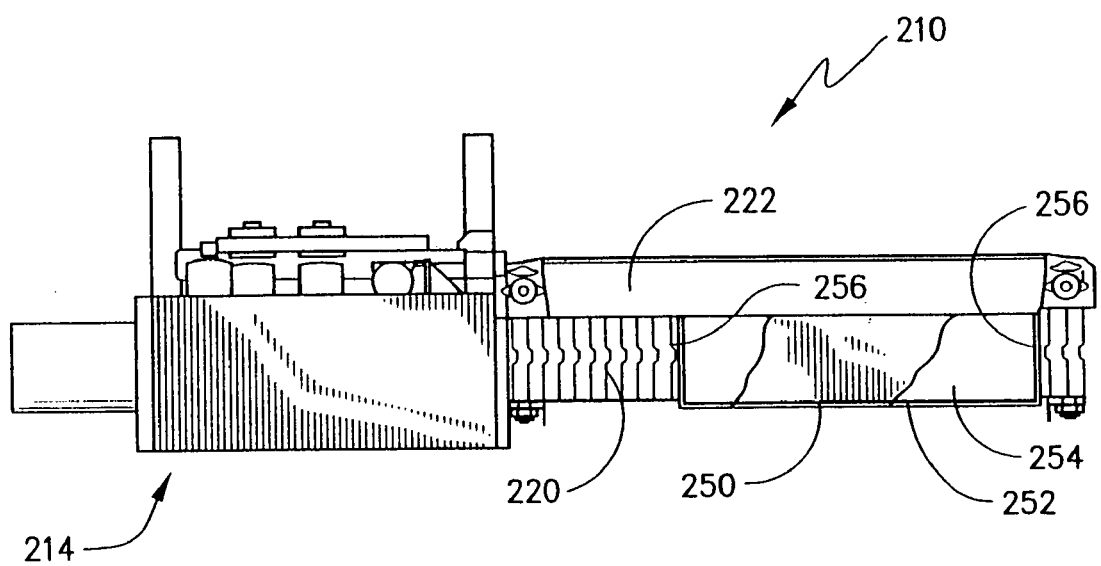
FIG. 10 is a top plan view, in diagrammatic form, of the container transport and organizing apparatus (tube loader) of FIG. 9.
Figure 11:
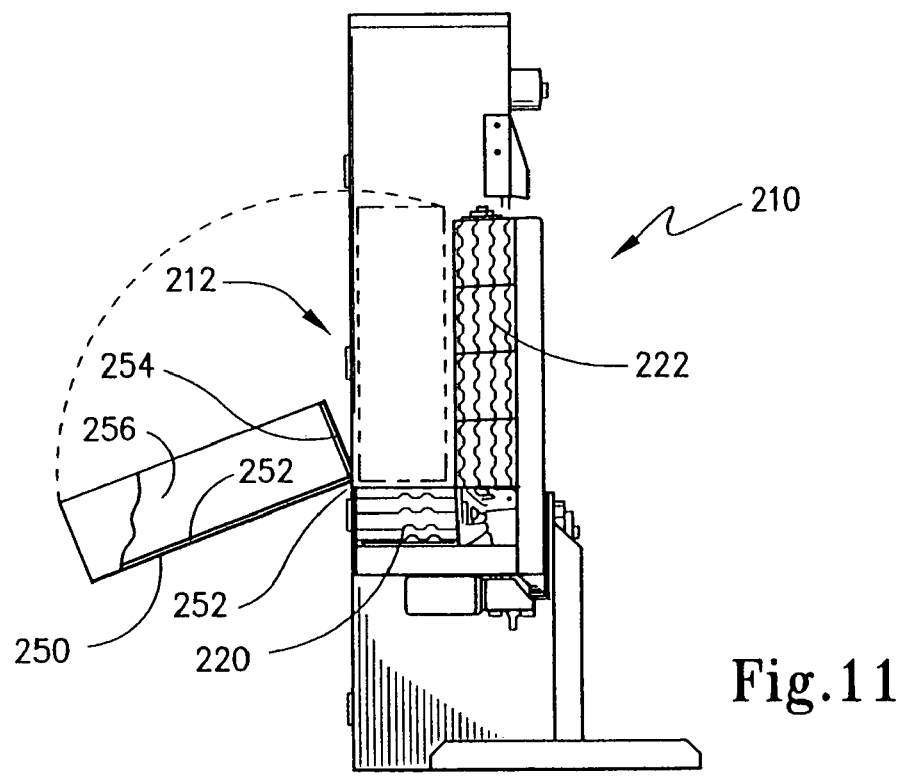
FIG. 11 is an end view in elevation, in diagrammatic form, of the container transport and organizing apparatus (tube loader) of FIGS. 9 and 10 showing the set feature for bulk tubes employed with this embodiment.

With reference now to FIGS. 9–11, a second exemplary embodiment of the present invention is provided. Since much of the structure shown in FIGS. 9–11 is similar to that shown in FIGS. 1–8, a detailed description of the same is not repeated. In these figures, however, tube loader 210 again includes a conveyor assembly 212, a tube elevator assembly 214 and a tube transfer assembly 216. Conveyor assembly 212 includes a lower conveyor 220 and an upper conveyor 222 that are generally perpendicular to one another. Here, however, the conveyors are not twisted but, rather, lower conveyor 220 is oriented in a horizontal plane while upper conveyor 222 is oriented in a generally vertical plane, as is shown in Figure Loading of tubes onto tube loader 210 may again employ a divider panel. Here, however, an additional supply of tubes may be loaded by means of a pivoting cassette loader 250 that is movable between a load position and an unload position. If desired, cassette loader 250 may be slideably mounted on a rail parallel to conveyor 220 so that cassette loader 250 may be slideably moved relative to the conveyor 220 to alter to location where tubes are discharged onto the conveyor belts. In FIGS. 10 and 11, it may be seen that cassette loader 250 includes a bottom wall 252, a pair of side walls 254 and a pair of end walls 256.

In FIG. 11, cassette loader 250 is further shown in the tilt down position or load position where it is pivoted away from conveyor assembly 212 on a hinge 252. A box of tubes may be placed in cassette loader 250 with the open end of the box in a downward position. The box is then removed so that the tubes reside in cassette loader 250. Cassette loader 250 is then tilted to the unload position shown in phantom in FIG. 11, and the tubes are ejected and deposited onto the conveyor assembly 212 for transport in the downstream direction. Cassette loader 250 thus facilitates the positioning of a box of tubes onto the conveyor assembly 212.

The present invention is also directed to method of handling and organizing containers in a manufacturing operation. It should be understood that the methodology of the present invention may include any of the processing steps that are accomplished by the above-described structures. Broadly, though, the method includes the first step of loading a bulk supply of containers at an upstream load area or an upstream conveyor assembly. Thereafter, the bulk supply of containers is advanced generally horizontally in a downstream direction thereby to create a reservoir of containers at a downstream supply area. The method then includes the step of columnizing the containers into a single file column and thereafter transporting each individual container to a location elevated with respect to the upstream conveyor assembly. Finally, the method includes discharging each individual container at a discharge location for further manufacturing operations.

As noted, this method may include any of the steps inherent in the above-described embodiments of the apparatus. Specifically, where the containers are each elongated in configuration along a central axis, the step of loading a bulk supply of containers at the upstream location is accomplished by placing the containers on an upstream conveyor assembly with the central axis of the containers oriented generally horizontally and transversely to the downstream direction.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. An apparatus adapted to transport and organize containers in a manufacturing operation, comprising;
    (A) an upstream conveyor assembly including a longitudinally extending first upstream conveyor and a longitudinally extending second upstream conveyor located alongside one another and having generally planar advance portions oriented at an oblique orientation angle with respect to one another, said upstream conveyor assembly having a load area at an upstream location thereof and operative to transport containers placed thereon in a downstream direction thereby to create a reservoir of containers at a downstream supply area thereof;
    (B) a downstream conveyor assembly including a plurality of bays each sized and adapted to receive a single container therein and operative to transport containers in the downstream direction from an intake location to a discharge location such that said containers will be discharged in single file at the discharge location, said downstream conveyor assembly operative to sequentially advance said bays past the intake location; and
    (C) a transfer assembly operative to sequentially remove selected containers one at a time from said reservoir and sequentially transport each said selected container to the intake location of said downstream conveyor assembly and thereafter deposit each selected container into a respective said bay as said bays are sequentially advanced past the intake location by said downstream conveyor assembly.

2. Apparatus according to claim 1 wherein said first upstream conveyor includes a first upstream conveyor belt with a first upstream belt advance portion and a first upstream belt return portions and wherein said second upstream conveyor includes a second upstream conveyor belt with a second upstream belt advance portion and a second upstream belt return portion.

3. Apparatus according to claim 2 wherein the orientation angle is about 9°.

4. Apparatus according to claim 2 wherein said first and second upstream conveyors longitudinally spiral over a rotational angle from the upstream location toward the downstream location.

5. Apparatus according to claim 4 wherein the rotational angle is about 45°.

6. Apparatus according to claim 2 wherein said first and second upstream conveyors are driven at a common rate of speed and including at least one divider panel adapted to be removably secured to said first and second upstream belt advance portions for common movement therewith such that, when secured, said divider panel forms an upstream wall for supporting containers located downstream thereof thereby to define a supply bin of variable size for holding said reservoir of containers.

7. Apparatus according to claim 1 wherein said downstream conveyor assembly includes a downstream conveyor belt having a downstream belt advance portion and a downstream belt return portion, said downstream conveyor belt having a plurality of vanes supported thereon for common movement therewith, said downstream conveyor belt and adjacent ones of said vanes defining said bays.

8. Apparatus according to claim 7 wherein said downstream conveyor includes a restraining guide extending alongside and is spaced relation to said downstream belt advance portion and operative to retain containers within said bays as said containers are advanced from the intake location to the discharge location.

9. Apparatus according to claim 8 wherein said restraining guide includes a guide panel having a width about the same as said downstream conveyor belt.

10. Apparatus according to claim 8 wherein the intake location is situated at a junction region of said downstream belt advance portion and said downstream belt return portion of said downstream conveyor belt, said restraining guide including an arcuate guide portion extending at least partially around said downstream belt advance portion and said downstream belt return portion at the intake location.

11. Apparatus according to claim 1 wherein said downstream conveyor assembly includes a discharge ramp disposed proximately to the discharge location.

12. Apparatus according to claim 1 wherein said transfer assembly includes rotatable transfer wheel having a plurality of radially projecting prongs oriented to engage each of the selected containers and sequentially transport each said selected container to the intake location of said downstream conveyor assembly.

13. Apparatus according to claim 12 wherein said transfer assembly includes a chute having a terminal end located proximately to said transfer wheel, said chute adapted to receive containers from said reservoir and dimensioned to allow single file passage of said containers therethrough.

14. Apparatus according to claim 13 including a shoe disposed at the terminal end of said chute, said shoe adapted to position each said selected container for engagement by said transfer wheel.

15. Apparatus according to claim 1 wherein said transfer assembly includes generally parallel first and second plate portions forming a chute, said first and second plate portions spaced apart from one another a distance selected to allow single file passage of said containers therethrough.

16. Apparatus according to claim 15 wherein said first plate portion is reciprocally movable in the upstream and downstream directions.

17. Apparatus according to claim 15 wherein said second plate is movable and including a sensor associated therewith to detect deflections of said second plate that are greater than a selected threshold.

18. Apparatus according to claim 1 wherein said transfer assembly includes a paddle member pivotally disposed at a position to act on containers in said reservoir.

19. Apparatus according to claim 18 including means operative to reciprocally pivot said paddle member.

20. An apparatus adapted to transport and organize containers in a manufacturing operation, comprising;

(A) an upstream conveyor assembly having a load area at an upstream location thereof and operative to transport containers placed thereon in a downstream direction thereby to create a reservoir of containers at a downstream supply area thereof, said upstream conveyor assembly including a cassette loader located at the load area and movable between a load position and an unload position, said cassette loader adapted to receive a bulk supply of said containers when in the load position and operative when moved to the unload position to deposit said bulk supply of containers onto the upstream load area of said upstream conveyor assembly for transport in the downstream direction toward said transfer assembly;

(B) a downstream conveyor assembly operative to transport containers in the downstream direction from an intake location to a discharge location such that said containers will be discharged in single file at the discharge location; and (C) a transfer assembly operative to sequentially remove selected containers from said reservoir and sequentially transport each said selected container to the intake location of said downstream conveyor assembly and thereafter deposit each selected container thereon.

21. Apparatus according to claim 20 wherein said cassette loader is pivotally supported relative to said upstream conveyor assembly.

22. Apparatus according to claim 21 wherein said cassette loader includes a cassette bottom wall, at least one cassette side wall and at least one cassette end wall for supporting containers placed therein.

23. An apparatus adapted to transport and organize containers in a manufacturing operation, comprising;

(A) an upstream conveyor assembly having a load area at an upstream location thereof and operative to transport containers placed thereon in a downstream direction thereby to create a reservoir of containers at a downstream supply area thereof, said upstream conveyor assembly including (1) a longitudinally extending first upstream conveyor having a first upstream conveyor belt with a first upstream belt advance portion and a first upstream belt return portion; and (2) a longitudinally extending second upstream conveyor having a second upstream conveyor belt with a second upstream belt advance portion and a second upstream belt return portion,
wherein said first and second upstream conveyor belts are located longitudinally alongside one another with said first upstream belt advance portion and said second upstream belt advance portion being oriented at an orientation angle with respect to one another thereby to define support surfaces for containers placed thereon;
  (B) a downstream conveyor assembly including a downstream conveyor belt having a downstream belt advance portion and a downstream belt return portion, said downstream conveyor belt having a plurality of vanes supported thereon for common movement therewith, said downstream conveyor belt and adjacent ones of said vanes defining a plurality of bays each sized and adapted to receive a single container therein and operative to transport containers in the downstream direction from an intake location to a discharge location such that said containers will be discharged in single file at the discharge location, said downstream conveyor assembly operative to sequentially advance said bays past the intake location; and
  (C) a transfer assembly operative to sequentially remove selected containers one at a time from said reservoir and sequentially transport each said selected container to the intake location of said downstream conveyor assembly and thereafter deposit each selected container into a respective said bay as said bays are sequentially advanced past the intake location by said downstream conveyor assembly.

24. Apparatus according to claim 23 wherein the orientation angle is about 9°.

25. Apparatus according to claim 23 wherein said first and second upstream conveyors are driven at a common rate of speed and including at least one divider panel adapted to be removably secured to said first and second advance portions for common movement therewith such that, when secured, said divider panel forms both an upstream wall for supporting containers located downstream thereof thereby to define a supply bin of variable size for holding said reservoir of containers.

26. Apparatus according to claim 23 wherein said upstream conveyor assembly includes a cassette loader located at the load area and movable between a load position and an unload position, said cassette loader adapted to receive a bulk supply of said containers when in the load position and operative when moved to the unload position to deposit said bulk supply of containers onto said upstream conveyor assembly for transport in the downstream direction toward said transfer assembly.

27. Apparatus according to claim 23 wherein said downstream conveyor includes a restraining guide extending alongside and is spaced relation to said advance portion and operative to retain containers within said bays as said containers are advanced from the intake location to the discharge location.

28. Apparatus according to claim 27 wherein the intake location is situated at a junction region of said advance portion and said return portion of said downstream conveyor belt, said restraining guide including an arcuate guide portion extending at least partially around said advance portion and said return portion at the intake location.

29. Apparatus according to claim 23 wherein said transfer assembly includes rotatable transfer wheel operative to sequentially transport each said selected container to the intake location of said downstream conveyor assembly.

30. Apparatus according to claim 29 wherein said transfer wheel includes a plurality of radially projecting prongs oriented to engage each of the selected containers.

31. Apparatus according to claim 23 wherein said transfer assembly includes a chute having a terminal end located proximately to said transfer wheel, said chute adapted to receive containers from said reservoir and dimensioned to allow single file passage of said containers therethrough.

32. Apparatus according to claim 31 including a shoe disposed at the terminal end of said chute, said shoe adapted to position each said selected container for engagement by said transfer wheel.

33. Apparatus according to claim 31 wherein said transfer assembly includes generally parallel first and second plate portions forming a chute, said first and second plate portions spaced apart from one another a distance selected to allow single file passage of said containers therethrough.

34. Apparatus according to claim 33 wherein said first plate portion is reciprocally movable in the upstream and downstream directions.

35. Apparatus according to claim 33 wherein said second plate is movable and including a sensor associated therewith to detect deflections of said second plate that are greater than a selected threshold.

36. Apparatus according to claim 23 wherein said transfer assembly includes a paddle member pivotally disposed at a position to act on containers in said reservoir.

37. An apparatus adapted to be positioned on a generally horizontal support surface when in an assembled state and operative to transport and organize containers in a manufacturing operation, comprising;
  (A) an elongated upstream conveyor assembly positioned generally parallel to the support surface when in the assembled state with a load area at an upstream location thereof and operative to transport containers placed thereon in a downstream direction thereby to create a reservoir of containers at a downstream supply area thereof;
  (B) an elongated downstream conveyor assembly positioned in an upright orientation relative to the support surface when in the assembled state so that it is inclined from a downstream intake location to an upstream discharge location, said downstream conveyor assembly including a plurality of bays each sized and adapted to receive a single container therein at the intake location and operative to transport containers from an intake location to the discharge location such that said containers will be discharged in single file at the discharge location, said downstream conveyor assembly operative to sequentially advance said bays past the intake location; and
  (C) a transfer assembly operative to sequentially remove selected containers one at a time from said reservoir and sequentially transport each said selected container to the intake location of said downstream conveyor assembly and thereafter deposit each selected container into a respective said bay as said bays are sequentially advanced past the intake location by said downstream conveyor assembly.

38. Apparatus according to claim 37 wherein said upstream conveyor assembly includes:
  (1) a longitudinally extending first upstream conveyor having a first upstream conveyor belt with a first upstream belt advance portion that advances in a downstream direction that is generally parallel to the support surface when in the assembled state and a first upstream belt return portion; and (2) a longitudinally extending second upstream conveyor having a second upstream conveyor belt with a second upstream belt advance portion that advances in a downstream direction that is generally parallel to the support surface when in the assembled state and a second upstream belt return portion, wherein said first and second upstream conveyor belts are located longitudinally alongside one another with said first upstream belt advance portion and said second upstream belt advance portion being oriented at an orientation angle with respect to one another thereby to define support surfaces for containers placed thereon.

39. Apparatus according to claim 37 wherein said downstream conveyor assembly includes a downstream conveyor belt having a downstream belt advance portion positioned at a large acute angle relative to the support surface when in the assemble state and a downstream belt return portion, said downstream conveyor belt having a plurality of vanes supported thereon for common movement therewith, said downstream conveyor belt and adjacent ones of said vanes defining said bays whereby containers will be discharged in single file at the discharge location under gravitational force.

40. An apparatus adapted to transport and organize containers in a manufacturing operation, comprising;

(A) an upstream conveyor assembly including an upstream conveyor belt with an upstream belt advance portion and an upstream belt return portion and having a load area at an upstream location thereof and operative to transport containers placed thereon in a downstream direction thereby to create a reservoir of containers at a downstream supply area thereof, said upstream conveyor assembly including at least one divider panel adapted to be removably secured to said upstream advance portion for common movement therewith such that, when secured, said divider panel forms an upstream wall for supporting containers located downstream thereof thereby to define a supply bin of variable size for holding said reservoir of containers;

(B) a downstream conveyor assembly operative to transport containers in the downstream direction from an intake location to a discharge location such that said containers will be discharged in single file at the discharge location; and (C) a transfer assembly operative to remove selected containers from said reservoir and transport each said selected container to the intake location of said downstream conveyor assembly and thereafter deposit each selected container thereon.

* * * * *